United States Patent [19]

Sugihara et al.

[11] 4,270,962

[45] Jun. 2, 1981

[54] PROCESS AND APPARATUS FOR THE PREPARATION OF BAR FORM FIBROUS MOLDING

[75] Inventors: Taizo Sugihara, Moriyamashi; Hiromu Sonoda, Shigaken, both of Japan

[73] Assignee: Chisso Corporation, Osaka, Japan

[21] Appl. No.: 92,054

[22] Filed: Nov. 6, 1979

[30] Foreign Application Priority Data

Nov. 15, 1978 [JP] Japan .................................. 53-140709

[51] Int. Cl.[3] ................................................ B29H 9/02

[52] U.S. Cl. ..................................... 156/180; 156/441

[58] Field of Search ........................ 156/441, 180, 166; 93/1 C, 77 FT; 131/266, 267, 268; 34/155, 156, 227, 228

[56] References Cited

U.S. PATENT DOCUMENTS

| | | | |
|---|---|---|---|
| 3,095,343 | 6/1963 | Berger | 156/441 X |
| 3,106,501 | 10/1963 | Cobb et al. | 156/180 |
| 3,393,685 | 7/1968 | Mumpower | 131/267 |
| 3,551,549 | 12/1970 | Sundbeck | 34/155 X |
| 3,606,689 | 9/1971 | Matsuo et al. | 34/155 |
| 3,645,819 | 2/1972 | Fujii et al. | 156/180 X |

FOREIGN PATENT DOCUMENTS 50-96331 7/1975 Japan .

*Primary Examiner*—David A. Simmons
*Attorney, Agent, or Firm*—Fred Philpitt

[57] ABSTRACT

Heat treating a fibrous bundle containing at least 20% by weight of adhesive fibers by introducing the fibrous bundle into a heating zone through an elongated transport zone that is surrounded by said heating zone, imparting heat to the exterior portion of said fibrous bundle by directing heat against the exterior of said transport zone and imparting heat throughout the interior of said fibrous bundle by directing heated gas outwardly through the interior of said transport zone in a direction opposite to the inward movement of said fibrous bundle through said transport zone.

8 Claims, 2 Drawing Figures

PROCESS AND APPARATUS FOR THE PREPARATION OF BAR FORM FIBROUS MOLDING

BACKGROUND

Figure 1:
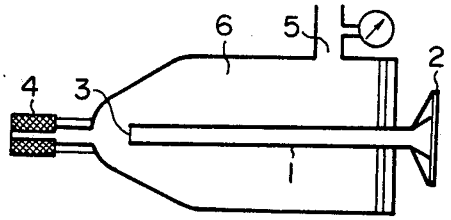

Bar formed fibrous moldings are used as signature pen cores and filters and are made from various fibers and binders and can be formed and cut to the desired shape and size. In the case of tobacco filters, a method is employed in which triacetyne is added to crimped tows and the tows are plasticized and made into bar form. Recently a method has been carried out in which head adhesive composite fibers are used to obtain fibrous moldings. For example, bar form fibrous moldings have been obtained by passing bundles of heat adhesive composite fibers into a pipe heated externally. In this case, however, the difference of the temperature between the surface and the inside of the fibrous bundle is apt to become so great that distortion of the molding will result.

THE PRESENT INVENTION

Considered from one aspect, the present invention involves a process which comprises (a) bringing together a plurality of separate fibers in the form of a fibrous bundle, at least 20% by weight of said fibers being heat adhesive composite fibers, (b) transporting said fibrous bundle through an elongated transporting zone that has a cross sectional area which approximately corresponds to the cross sectional area of the fibrous bundle, (c) introducing a stream of pressurized and heated gas into a heating zone, said heating zone surrounding said transporting zone so that the outlet end of said transporting zone is in open communication with the interior of said heating zone and the inlet end of said transporting zone communicates with the exterior of said heating zone, (d) establishing a flow of said pressurized and heated gas through said transporting zone countercurrent to the movement of said fibrous bundle through said elongated transporting zone and then out of said transporting zone to a point outside of said heating zone, whereby the heated gas introduced into said heating zone will impart heat to said fibrous bundle both (1) by the indirect heat applied from points exterior of said elongated transporting zone and (2) by direct heat by the hot gas passing through the interior of said elongated transporting zone, said heated gas having a temperature of about 100° C.–250° C. and being under a pressure of about 0.5–10 kg/cm(G), (e) transporting said fibrous bundle from the outlet aperture of said elongated transporting zone across an open space within said heating space and then out through a die outlet aperture from said heating zone, and (f) withdrawing a fibrous bundle from said heating zone with the fibers adhered together into bar form by said heat adhesive composite fibers that have been activated by said heat treatment.

Stated in another way, the object of this invention is to prepare bar form fibrous moldings which are composed of composite fibers that have been uniformly adhered together by heat, the process being carried out easily and within a very short time. We have found that when heat adhesive composite fibers are contacted directly and sufficiently with hot compressed gas of the proper temperature, the fibers get to their heat adhesive state very quickly. More specifically, this invention relates to a process for the preparation of bar form fibrous moldings by first heating and then cooling fibrous bundles containing at least 20% by weight of heat adhesive composite fibers, characterized in that a molding apparatus is used which consists of a heating chamber, a heating gas inlet mounted in the wall of the heating chamber, a fibrous bundle outlet that includes a die having the desired sectional shape, and a fibrous bundle transporting pipe having a larger cross-sectional area of an aperture than the cross-sectional area of the aperture of the die, positioned within the heating chamber (or jetting chamber), the fibrous bundles being passed continuously in one direction through this pipe while most of hot compressed gases are moved continuously in the opposite direction through the pipe.

Heat adhesive composite fibers useful in accordance with this invention may be any heat adhesive fibers in which the melting point difference between the composite components is between 10° C. and 100° C. and the lower melting point component forms at least a part of the fiber surface. In a preferred embodiment, the melting point difference is 20° C. to 60° C., the circumferential proportion in the fiber cross-section, of the lower melting point component, is from 50 to 100%, and the structure of the fibers is of the side-by-side type or the sheath-core type. As examples of combinations in the composite components there can be mentioned polypropylene/polyethylene, polypropylene/ethylene-vinyl acetate copolymer or its saponified product or its mixture with polyethylene, polyester/polypropylene, and nylon 6/nylon 66. The lower melting point component is molten and adhered by heating at a temperature that is between the melting points of the two composite components, while being still in its fibrous form. Its size may be selected within a wide range from 0.5 D/F (abbreviation of "denier per filament") to 200 D/F. Either crimped or uncrimped fibers may be used, but for example crimped ones having from 3 folds/inch to 30 folds/inch are desirable. They may be crimped either mechanically or three-dimensionally. Fibrous bundles may be used in the form of tows, filaments, slivers, spun yarns of staple fibers, etc. Other fibers that may be mixed with the said composite fibers would include natural fibers, bast fibers, chemical fibers, synthetic fibers and the like.

As a gas for the hot compressed gas, air or steam is generally preferred, but other gases such as nitrogen may also be used. Steam is more heat conductive than air, and this permits a more compact apparatus and a faster molding speed. However, heated air is better than steam when humidity is undesirable. In order to conduct large amounts of heat to a fibrous bundle as rapidly as possible, the heated gas is compressed or pressurized before it is introduced into the bundle heating zone, and it is then passed through the inside of the fibrous bundles as a strong gas stream by jetting the heated gas continuously into the heating zone. Thereafter, the pressure in the heating zone is reduced and the gas in the heating zone is discharged to atmosphere. For this, it is desirable that the original pressure of the heated gas introduced into the heating zone is from about 0.5 to 10 kg/cm gauge (hereafter abbreviated G), and the temperature of the gas before jetting is from about 100° C. to about 250° C. In order to heat the gas, it may be passed through a heating device heated by a sheath heater, or through a pipe which is heated externally.

Figure 2:
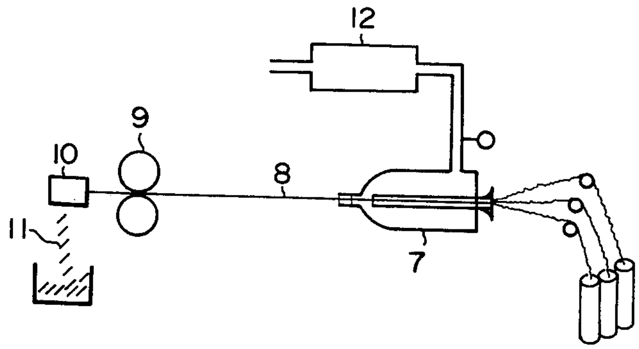

This invention will be illustrated with reference to the attached drawings wherein:

FIG. 1 shows a preferred embodiment of a molding apparatus useful in accordance with the process of this invention; and FIG. 2 shows how the apparatus of FIG. 1 cooperates with other equipment.

In these figures, 1 is a fibrous bundle introducing pipe or transport pipe, 2 is a trumpet-shaped guide at one end of the pipe, 3 is the tip or the outlet end of the pipe, 4 is a die, 5 is an inlet jetting aperture for heating gas, 6 is a heating chamber or jetting chamber, 7 is the entire molding apparatus, 8 is a fibrous bundle, 9 are drawing rollers, 10 is a cutter, 11 is the cut product and 12 is a gas heating device.

A plurality of fibers are introduced continuously through the trumpet-shaped guide 2 into the pipe 1 by operation of the drawing rollers 9, and the fibrous bundle exiting at 3 is drawn via die 4 out of the molding apparatus 7. When hot compressed gas is introduced continuously through the jetting aperture 5, the pipe 1 is heated externally by the heated gas. The primary avenue of escape for this heating gas is outwardly through the interior of pipe 1 in a direction countercurrent to the inward movement of the fibrous bundle through the pipe 1. Since the cross sectional area of the pipe 1 aperture is larger than that of the die 4 aperture, the density of the fibers is low enough to leave gaps in the fiber bundle. So, even if the length of the pipe 1 is long, most of the heated hot gas will pass out through the pipe 1 and be discharged to the atmosphere. Fibrous bundles are therefore not only heated externally when passing through the pipe 1, but also directly heated by the hot gas which passes through the interior of pipe 1. Consequently, fibrous bundles are contacted with the hot gas uniformly both indirectly and directly and are thereby converted to an adhesive state within a very short time, such as from 0.1 to 2 seconds. If only the external surface of the introducing pipe 1 is heated, the interior of the fibrous bundles is not sufficiently heated, while if the hot gas is only passed through the inside of the pipe 1, the heating of the fibrous bundles is not sufficient because the gas in the space that is closer to the outer surface of the pipe 1 than to the center of the pipe may be too cool.

The fibrous bundle is further heated as it moves into the space between the tip 3 of the pipe 1 and the die 4 and thus many types of sectional forms can be easily and surely made by means of various types of dies. By positioning the jetting aperture 5 close to the inlet end (right end) of the pipe 1, the external surface of the pipe 1 may be heated uniformly and avoiding the overheating and the disorder of the fibrous bundle that would occur if the hot air was jetted directly towards fibrous bundles at the point that they issued from the tip 3 of the pipe 1. The pipe 1 is usually of constant diameter as in FIG. 1, but the left end may be of less diameter than the right end so that the heated gases gradually expand as they move through the transporting tube. In accordance with the present invention, since the hot air is passing from left to right through the fibrous bundle in the pipe 1, the fibrous bundles will be heated rather uniformly and at a relatively low density so that if the fibrous bundles have a tendency to be distorted by heat, any latent crimping or shrinking will be produced uniformly. Consequently, the form obtained after molding by the die 4 will be stable and its form will not be distorted.

If the cross-sectional area of the pipe 1 aperture is too large, the hot gas passes too rapidly (left to right) through the pipe 1 with the result that it is difficult to properly heat the fibrous bundle. On the other hand, when the cross sectional area is too small, fibrous bundles may be compressed into so tight an adhesive mass that, in the extreme case, it cannot be drawn from the die 4. We have found that it is preferably to have the cross-sectional area of the pipe 1 aperture or the tip 3 aperture when the pipe 1 is tapered, about 1.2 to 4 times the cross-sectional area of the die 4 aperture.

As to the length of the transport or introducing pipe 1, it has been found desirable to provide an open gas between the outlet 3 of the pipe 1 and the die 4 which is equal to about 10–30% of the total length of the chamber 7 (measured between the die 4 and the point where the pipe 1 enters the chamber 7) so as to be able to apply heat to the outer circumference of the fibrous bundle directly by hot gas within a short time.

The configuration of the molding die 4 may be of any desired sectional shape, for example, circular, elliptical, a wave-like circumference, and a zigzag circumference. It may be made of conventional stainless steel, but if fibrous bundles are particularly adhesive to metal, teflon (a trade name of polyethylene tetrafluoride) may be used alone or in conjunction with steel.

Molded bars that issue from the die 4 are cooled and solidified, drawn by the drawing device 9 and cut by the cutter 10 to the desired length. Cooling may be carried out by any conventional method such as by passing the bar through a pipe cooled by air, water or the like. In the case of the air cooling, it is generally carried out between the die 4 and the drawing device 9. Drawing can be achieved by nipping only slightly with a couple of rolls.

The following may be mentioned as advantages of this invention:

(1) The bar form fibrous moldings obtained are adhered enoughly and uniformly not only on their outer portion but also on their inner portion and have good dimensional stability;

(2) The preparation of bar form fibrous moldings is very easy and rapid, and the apparatus for it is compact; and (3) The bar type fibrous moldings can be made to have volumetric densities that vary within a considerably wide range from large one to small one such as from 40% to 1%.

The invention will now be illustrated by the following examples, which are not intended to limit the invention.

EXAMPLE 1

Heat adhesive composite filaments, in which the lower melting point component is polyethylene (m.p. 135° C.), the higher melting point component is polypropylene (m.p. 165° C.) and the circumferential proportion of the lower melting point component in the fiber cross section is 60%, are collected and drawn three times their length at room temperature and then relaxed to obtain a fibrous bundle with a total size of 300,000 deniers wherein the size per filament is 3 D/F and the filaments have crimps. From this fibrous bundle, a bar form fibrous molding was prepared as follows. While 5 $kg/cm^2$ (G) of steam heated to 140° C. is jetted continuously into an apparatus as indicated in FIG. 1 wherein the pipe 1 was 20 cm in length (hereafter the "length" of the pipe means the length of the part inside the chamber 7, the total length of the chamber 7 being 24 cm) and 21 mm in diameter, and a circular die of 15 mm diameter, the said fibrous bundle is passed continuously at 30 m/min through chamber 7, drawn out of the die 4 as a molded bar, cooled by air, cut to 10 cm and made into cores for oily signature pens.

Because of the uniform adherence of the crimped fibrous bundles in these cores a uniform network of open spaces is provided which enhances its ink retaining properties. Furthermore, since the cores are composed of a fibrous bundle consisting of continuously filaments, the flow of ink is smooth. For these reasons, the cores are most suitable for signature pens.

EXAMPLE 2

Thirty percent by weight of heat adhesive composite staple fibers having 102 mm of length, 3 D/F, and high crimpability, in which (a) the lower melting point component is a 1:3 blended mixture (m.p. 110° C.) of ethylene-vinyl acetate copolymer (hereinafter expressed as EVA) (20% by weight of vinyl acetate) and polyethylene and (b) the higher melting point component is polypropylene (m.p. 165° C.) and the circumferential proportion of the lower melting point component in the fiber cross-section is 80%, are mixed with 70% by weight of high crimpability cellulose acetate staples with 4 D/F and 102 m/m of length by a card to obtain slivers of 9 g/m.

The slivers were introduced continuously into a molding apparatus similar to that shown in FIG. 1 wherein the pipe 1 is 30 cm in length (total length of the jetting chamber 7 being 42 cm) and 15 mm in diameter, into which 3 $kg/cm^2(G)$ of compressed air heated at 120° C. is jetted continuously, drawn through a circular spinneret of 8 mm diameter, cut to 102 m/m and made into plugs for tobacco filters. Their smoking taste and nicotine tar retention properties were good. They are elastic and durable.

EXAMPLE 3

Crimped tows with total denier of 1,000,000 deniers consisting of heat adhesive composite fibers (sheath-core structure, 30 D/F), in which the lower melting point component is polypropylene (m.p. 165° C.) and the higher melting point component is a polyester (m.p. 190° C.), are opened, then introduced continuously to an apparatus similar to the one shown in FIG. 1, equipped with a fiber bundle introducing pipe 1 of 50 cm length and 35 mm diameter (total length of the jetting chamber 7 being 65 cm) into which 5 $kg/cm^2(G)$ of steam heated at 170° C. is jetted continuously and a bar drawn out through a star-shaped die 4 (the length of its one side being 1.5 cm) to make fibrous piles of 15 m length, which are used as drain material for soft ground.

As they are constructed of fiber bundles consisting of continuous filaments, their strength is great. As the fibers of the bundles are adhered together only at spaced apart contacting points, water permeable effect is large (water permeable coefficient being $3.7\times10^{-2}$ cm/sec). Because of the star-shaped configuration of the piles, the water collecting effect is large. Furthermore, they are light. For these reasons, they are most suitable as a drain material.

EXAMPLE 4

Crimped filaments made of heat adhesive composite fibers (6 D/F), in which the lower melting point component is EVA (5% by weight of vinyl acetate) (m.p. 105° C.) and the higher melting component is polypropylene (m.p. 165° C.) and the circumferential proportion in the fiber cross-section, of the lower melting point component, is 70%, are collected to form a fibrous bundle of 70,000 deniers and introduced continuously to a molding apparatus similar to that shown in FIG. 1 equipped with a fibrous bundle introducing pipe 1 of 20 cm length and 5.5 mm diameter (total length of the jetting chamber 7 being 23 cm) into which 2 $kg/cm^2$ of air heated at 130° C. is jetted continuously, pressed at an outlet zone by means of a square die of 4 m/m square to provide a hard finish, cooled and cut. The tips of the cut portions were then shaved conically or in an acute angular form to make core tips of brushes or of signature pens.

As they are constructed of fibrous bundles consisting of continuous filaments, the flow of liquids such as ink is good. They are hard but elastic and are suitable as core tips of writing instruments or cosmetic brushes.

We claim:

1. A process which comprises (a) bringing together a plurality of separate fibers in the form of a fibrous bundle, at least 20% by weight of said fibers being heat adhesive composite fibers, (b) transporting said fibrous bundle through an elongated transporting zone that has a cross sectional area which approximately corresponds to the cross sectional area of the fibrous bundle, (c) introducing a stream of pressurized and heated gas into a heating zone, said heating zone surrounding said transporting zone so that the outlet end of said transporting zone is in open communication with the interior of said heating zone and the inlet end of said transporting zone communicates with the exterior of said heating zone, (d) establishing a flow of said pressurized and heated gas through said transporting zone countercurrent to the movement of said fibrous bundle through said elongated transporting zone and then out of said transporting zone to a point outside of said heating zone, whereby the heated gas introduced into said heating zone will impart heat to said fibrous bundle both (1) by the indirect heat applied from points exterior of said elongated transporting zone and (2) by direct heat by the hot gas passing through the interior of said elongated transporting zone, said hot gas having a temperature of about 100° C.–250° C. and being under a pressure of about 0.5–10 $kg/cm^2(G)$, (e) transporting said fibrous bundle from the outlet aperture of said elongated transporting zone across an open space within said heating zone and then out through a die outlet aperture from said heating zone, the interval that said fibrous bundle is exposed to heating in said open space being between 10% and 30% of the entire interval that the fibrous bundle is in said heating zone, and (f) withdrawing a fibrous bundle from said heating zone with the fibers adhered together into bar form by said heat adhesive composite fibers that have been activated by said heat treatment.

2. The process of claim 1 wherein the fibrous bundles are tows, filaments, slivers or spun yarns of staple fibers.

3. The process of claim 1 wherein the fibrous bundles comprise from 20% by weight to 100% by weight of heat adhesive composite fibers and from 80% by weight to 0% by weight of at least one fiber selected from natural fibers, bast fibers, chemical fibers and synthetic fibers.

4. The process of claim 1 wherein the melting point difference between the composite component comprising the heat adhesive composite fibers is from 10° C. to 100° C., the circumferential proportion of the lower melting point component in the fiber cross-section is from 50 to 100% and the structure of the composite fibers is side-by-side or sheath-core type.

5. A process of claim 1 wherein the melting point difference between the composite component comprising the heat adhesive composite fibers is from 20° C. to 60° C., the circumferential proportion of the lower melting point component in the fiber cross-section is from 50 to 100% and the structure of the composite fibers is side-by-side type or sheath-core type.

6. The process of claim 1 wherein the composite components comprising the heat adhesive composite fibers are those selected from the group consisting of polypropylene/polyethylene, polypropylene/ethylene-vinyl acetate copolymer, polypropylene/saponified ethylene-vinyl acetate copolymer, polypropylene/mixture of ethylene-vinyl acetate copolymer and polyethylene, polypropylene/mixture of saponified ethylene-vinyl acetate copolymer and polyethylene, polyester/-polypropylene, and nylon 6/nylon 66.

7. The process of claim 1 wherein the ratio of the cross sectional area of the outlet aperture of the transporting zone and the cross-sectional area of said die aperture is from 1.2 to 4.

8. An apparatus for molding together a fibrous bundle containing at least 20% by weight of heat adhesive composite fibers which comprises (a) a heating chamber, (b) an elongated hollow pipe extending into said heating chamber, the inner end of said pipe consisting of an outlet that terminates in the interior of said heating chamber and the outer end of said pipe consisting of an inlet that is on the exterior of said heating chamber, (c) an inlet for heating gas located in the wall of said heating chamber at a point closer to the said outer end of said pipe than the inner end of said pipe, and (d) a die outlet in the wall of said heating chamber through which the fibrous bundle is adapted to be withdrawn after it has passed through said pipe.

* * * * *